(12) United States Patent
Hou et al.

(10) Patent No.: US 6,491,118 B1
(45) Date of Patent: Dec. 10, 2002

(54) HYDROSTATIC SYSTEM WITH CHARGE FLOW MONITORING

(75) Inventors: Yifei Raymond Hou, Waterloo, IA (US); Sanjay Ishvarlal Mistry, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/716,636

(22) Filed: Nov. 20, 2000

(51) Int. Cl.⁷ .............................................. B62D 11/00
(52) U.S. Cl. ..................................................... 180/6.44
(58) Field of Search ................................ 180/6.2, 6.44, 180/6.7; 417/364; 60/364, 34

(56) References Cited

U.S. PATENT DOCUMENTS

| | | | |
|---|---|---|---|
| 3,592,281 A | * 7/1971 | Utter et al. ................. | 180/6.48 |
| 3,680,312 A | * 8/1972 | Forster ......................... | 60/455 |
| 3,717,213 A | 2/1973 | Roe et al. | |
| 3,800,901 A | * 4/1974 | Blomstrom et al. ........ | 180/305 |
| 3,901,339 A | * 8/1975 | Williamson .................. | 180/21 |
| 4,069,884 A | 1/1978 | Morrow et al. | |
| 4,395,878 A | 8/1983 | Morita et al. | |
| 4,399,886 A | 8/1983 | Pollman et al. | |
| 4,400,935 A | 8/1983 | Louis | |
| 4,503,594 A | * 3/1985 | Gall et al. .................... | 138/41 |
| 4,559,778 A | * 12/1985 | Krusche ....................... | 417/217 |
| 4,620,416 A | 11/1986 | Yip et al. | |
| 4,629,258 A | * 12/1986 | Resch et al. ................ | 303/113.4 |
| 4,637,281 A | * 1/1987 | Vanselous ................... | 477/135 |
| 4,649,705 A | * 3/1987 | Williamson .................. | 60/420 |
| 4,703,664 A | * 11/1987 | Kirkpatrick et al. ...... | 73/152.21 |
| 4,754,824 A | 7/1988 | Olsson | |
| 4,873,880 A | 10/1989 | Amedei et al. | |
| 4,955,442 A | * 9/1990 | Crabb et al. ................ | 137/636 |
| 5,101,630 A | * 4/1992 | Wagenseil ................... | 180/244 |
| 5,154,585 A | * 10/1992 | Spencer ....................... | 417/364 |
| 5,191,950 A | 3/1993 | Kleineisel et al. | |
| 5,222,867 A | * 6/1993 | Walker et al. ................ | 417/12 |
| 5,259,470 A | 11/1993 | Akahane et al. | |
| 5,390,751 A | * 2/1995 | Puetz et al. .................. | 180/6.3 |
| 5,486,040 A | * 1/1996 | Beck et al. ............... | 303/113.2 |
| 5,492,512 A | * 2/1996 | Wu .............................. | 180/244 |
| 5,515,938 A | * 5/1996 | Haga et al. .................. | 180/417 |
| 5,547,266 A | * 8/1996 | Beck et al. ............... | 303/113.2 |
| 5,701,970 A | 12/1997 | Arbjerg | |
| 5,948,029 A | * 9/1999 | Straetker .................... | 180/6.44 |
| 6,027,177 A | 2/2000 | Ferguson et al. | |
| 6,062,332 A | * 5/2000 | Stephenson et al. ........ | 180/305 |
| 6,179,072 B1 | * 1/2001 | Hou ............................ | 180/6.44 |
| 6,186,262 B1 | * 2/2001 | Mann et al. ................. | 180/308 |

FOREIGN PATENT DOCUMENTS

| | | | | |
|---|---|---|---|---|
| DE | 4118869 A1 | * 12/1992 | ............. | F04B/1/08 |
| JP | 05312082 A | * 11/1993 | ........... | F02D/45/00 |
| JP | 05312084 A | * 11/1993 | ........... | F02D/45/00 |

* cited by examiner

Primary Examiner—Avraham Lerner
Assistant Examiner—Paul Royal, Jr.

(57) ABSTRACT

A system for monitoring the charge flow in a hydrostatic system. The system provides a sharp edge orifice restriction in the drain from the hydrostatic pump, creating a back pressure in the drain that is proportional to the fluid flow through the drain. A pressure switch mounted in the pump case, or in the drain, detects the back pressure in the drain. The pressure switch is designed to be activated at a back pressure that corresponds to the intended charge flow at a specific engine speed. During operation, if the back pressure is not sufficient to cause the pressure switch to be activated at the predetermined engine speed or at a faster engine speed, the charge flow is not sufficient and a warning signal is generated.

4 Claims, 1 Drawing Sheet

HYDROSTATIC SYSTEM WITH CHARGE FLOW MONITORING

BACKGROUND OF THE INVENTION

1. Field of the Invention

The present invention relates to a hydrostatic system and in particular to a system having a means for monitoring the charge pump flow to ensure adequate charge flow is provided to the hydrostatic pump.

2. Description of the Related Art

A hydrostatic drive utilizes fluid at high pressure and relatively low speed to transfer energy in a closed circuit between a hydrostatic pump and motor. The raise in pressure of the fluid, which will not compress, is what transfers the energy. A charge pump is used to supply fluid, usually oil, under pressure to the hydrostatic pump. An adequate supply from the charge pump is required for proper functioning of the hydrostatic system.

When a hydrostatic system is used to steer a vehicle, such as a track laying vehicle, it is desirable to monitor the flow of the charge pump to ensure that adequate flow is provided for proper steering functioning. Over time, the charge pump may wear, causing a decrease to occur in the charge flow. In a hydrostatic steering system, fluid flow is only required during a relatively small portion of the vehicle operating time, when the vehicle is being turned.

One attempt to monitor the charge flow has been to sense the charge pressure. However, since charge flow is only needed during turning, even if the pump has worn, there will likely be enough charge flow for the charge pressure to be adequate. That is, until steering is needed and the charge flow is now inadequate and the pressure drops. Thus, a pressure sensor at the charge flow outlet is only adequate to detect a catastrophic and sudden failure of the charge pump.

SUMMARY OF THE INVENTION

The present invention provides a system for monitoring the charge flow so that a decrease in the flow rate, even if the charge flow pressure remains satisfactory, can be detected. In a hydrostatic system, the case drain flow from the pump and the motor are joined and directed to the reservoir. The charge pump flow and the drain flow are thus equal. The system of the present invention provides a sharp edge orifice restriction in the drain, creating a back pressure in the drain that is proportional to the fluid flow through the drain. A pressure switch mounted in the pump case, or in the drain, detects the back pressure in the drain. The pressure switch is designed to be activated at a back pressure that corresponds to the intended charge flow at a specific engine speed. During operation, if the back pressure is not sufficient to cause the pressure switch to be activated at the predetermined engine speed or at a faster engine speed, the charge flow is not sufficient and a warning signal is generated.

DESCRIPTION OF THE PREFERRED EMBODIMENT

Figure 1:
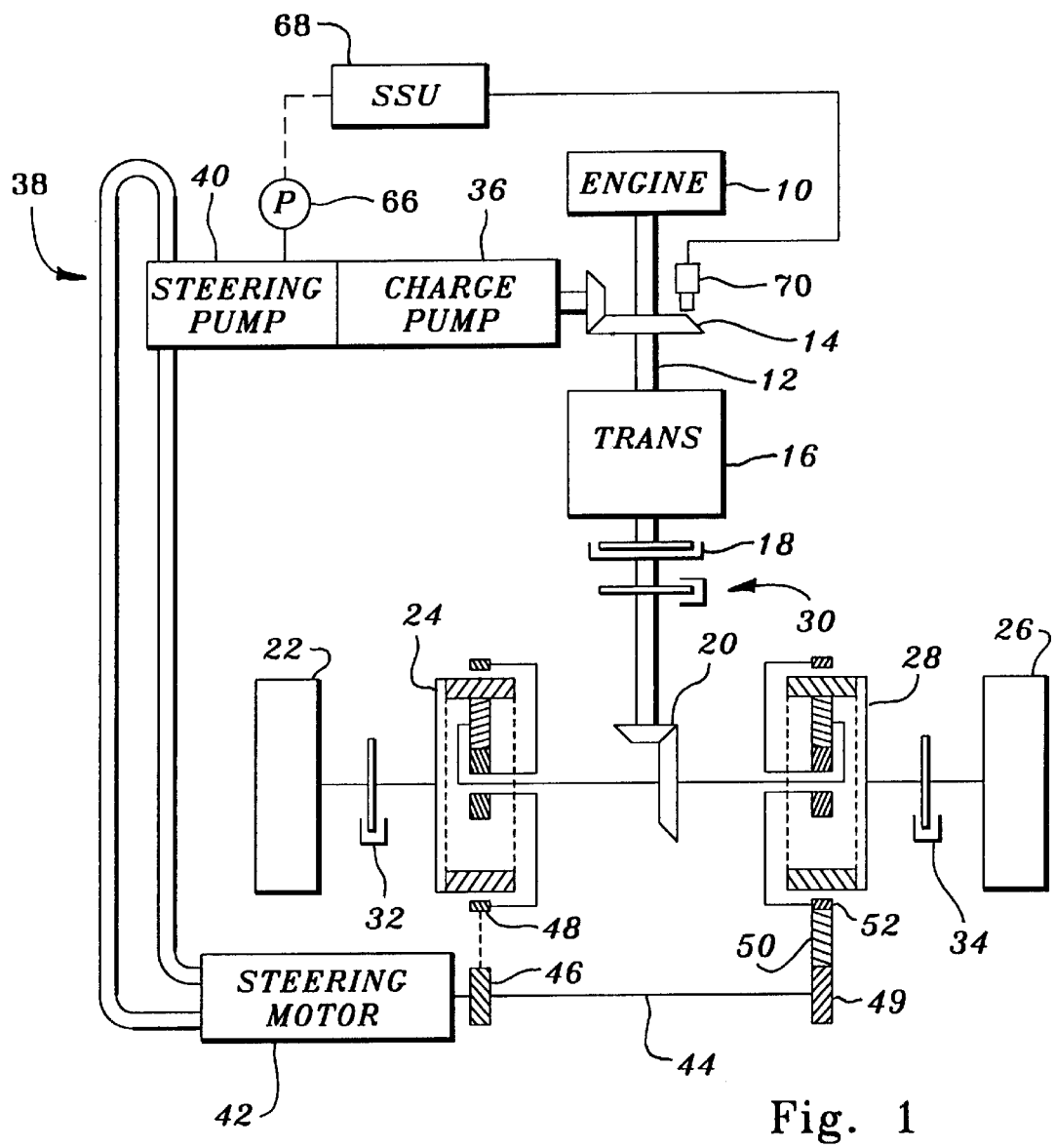
FIG. 1 is a simplified schematic diagram of a track laying vehicle drive and hydrostatic steering system.

Referring to FIG. 1, a drive train of a track laying vehicle includes an engine 10 with an output shaft 12 that drives a right angle gear 14 and a transmission 16. The transmission 16 drives a clutch 18 that in turn drives a final or right angle drive 20. The final drive 20 drives a left track drive wheel 22 and a right track drive wheel 26 via left and right steering planetary drives 24, 28. The steering planetary drives 24, 28 are preferably as described in U.S. Pat. No. 5,390,751 assigned to the Assignee of this application. Additional outboard planetary final drives (not shown), as provided on John Deere 8000T tractors are mounted between the steering planetary and the respective drive wheels but are not further described herein because they are not involved in the hydrostatic steering system that is the subject matter of this application. A parking brake 30 is coupled to shaft 12 and left and right service brakes 32, 34 are coupled to the left and right drive wheels 22, 26 respectively.

The engine 10, through the right angle gear 14, drives a charge pump 36 and a variable displacement hydrostatic steering pump 40 of a hydrostatic steering system 38. The pump 40, in turn, powers a hydraulic fixed displacement steering motor 42. The steering motor 42 drives a ring 48 of the left planetary drive 24 through a cross shaft 44 and a gear 46. The steering motor 42 also drives a ring 52 of the right planetary drive 28 through the cross shaft 44, gear 49 and reverser gear 50. Rotation of the cross shaft 44 will simultaneously drive the left and right planetary drives to add to the speed of one drive wheel while subtracting an equal speed from the other drive wheel to effect a turning of the vehicle. The swash plate of the steering pump 40 is controlled by a steering controller to vary the output speed of the steering motor 42 and hence the speed of the cross shaft 44.

Figure 2:
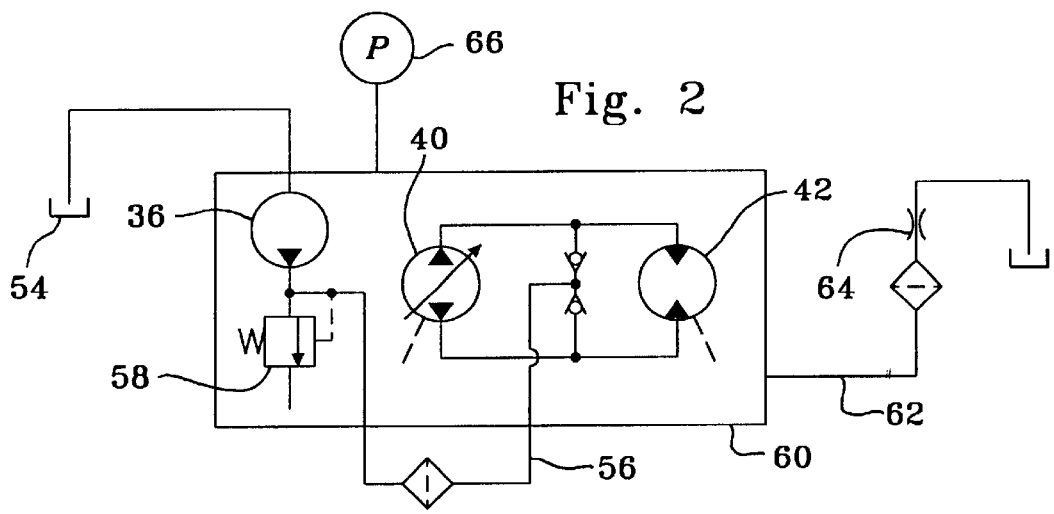
FIG. 2 is a hydraulic schematic of the hydrostatic steering system of FIG. 1.

With reference to FIG. 2, the hydraulic flow path for the steering system 38 is shown in greater detail. The charge pump 36 receives fluid from a sump 54 and provides the fluid under pressure to the pump 40 through a line 56. A pressure relief valve 58 returns fluid to the sump if an excess pressure is achieved in the line 56. The charge pump, and hydrostatic pump and motor 40, 42 are shown in a steering case 60. The charge flow, which must drain from the pump 40 flows from the case through a drain 62 back to a sump. A sharp edge orifice 64 is placed in the drain to create a back pressure in the drain and the case 60. The back pressure is directly proportional to the flow in the drain which is equal to the charge pump flow. Thus the back pressure can be used to determine the charge flow.

A pressure switch 66 measures the back pressure in the case 60. The pressure switch could also be located in the drain 62. The pressure switch, when activated, sends a signal to a steering system control unit 68. The steering system control unit also receives an engine speed signal from a rotation speed sensor 70, such as a commercially available magnetic pickup mounted in proximity to the right angle drive 14. The sensor 70 provides an engine speed signal to the steering system control unit 68.

The pressure switch 66 is activated at a predetermined pressure that correlates with the back pressure produced by the orifice 64 at the intended charge flow. The steering system control unit 68 will issue a warning signal if the pressure switch 66 has not been activated at a predetermined engine speed. For example, if the pressure switch is activated at a back pressure corresponding to the charge flow at 1400 rpm engine speed, the steering system unit 68 may be programmed to send a warning if the pressure switch is not activated when the engine speed is at 1900 rpm. If the pressure switch is not activated at that engine speed, this would indicate that the charge flow is less than 73% of the normal flow at 1900 rpm. By activating the warning at a flow less than 100%, allowance is made for a degree of wear. This would allow some wear and deterioration in the charge pump flow over time prior to a warning being activated.

Alternatively, the pressure switch 66 could be replaced by a pressure transducer that produces an analog signal corresponding to the back pressure. This signal would be converted to a digital signal by an analog-to-digital converter. Again, if a predetermined pressure is not achieved at a give engine speed, an appropriate warning would be provided.

The addition of the orifice 64 and pressure sensor switch 66 provides for a relatively simple way of monitoring the charge pump flow and providing a warning if the flow decreases below a give level.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydrostatic system comprising:

a hydrostatic pump and motor in fluid communication with one another;

a charge pump providing a flow of fluid to the hydrostatic pump and motor, the charge pump receiving fluid from a sump;

a fluid drain from the hydrostatic pump and motor to the sump, the drain flow being generally equal to the charge pump flow;

an orifice in the drain the orifice being of a size selected to create a drain back pressure proportional to the charge and drain flow; and a pressure sensor to monitor the drain back pressure and thereby the charge pump flow, the sensor providing a warning signal when the charge pump flow drops below a predetermined level.

2. The hydrostatic system as defined by claim 1 wherein the pressure sensor is a switch that is actuated at a predetermined pressure.

3. A hydrostatic steering system driven by an engine comprising:

a hydrostatic pump and motor in fluid communication with one another, the pump being driven by the engine;

a charge pump driven by the engine to provide a flow of fluid to the hydrostatic pump and motor, the charge pump receiving fluid from a sump;

a fluid drain from the hydrostatic pump and motor to the sump, the drain flow being generally equal to the charge pump flow;

an orifice in the drain the orifice being of a size selected to create a drain back pressure proportional to the charge and drain flow;

a pressure sensor to monitor the drain back pressure and an engine speed sensor to monitor the speed of the engine; and a steering system control unit receiving signals from the pressure sensor and the speed sensor to initiate a warning in the event the drain pressure is less than a predetermined amount at a given engine speed.

4. The hydrostatic system as defined by claim 3 wherein the pressure sensor is a switch that is actuated at a predetermined pressure.

* * * * *